US008601709B2

(12) United States Patent
Sun

(10) Patent No.: US 8,601,709 B2
(45) Date of Patent: Dec. 10, 2013

(54) MEASUREMENT DEVICE FOR MEASURING LENGTH OF AN ELECTRICAL WIRE BETWEEN TWO CONNECTORS

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 292 days.

(21) Appl. No.: 13/095,944

(22) Filed: Apr. 28, 2011

(65) Prior Publication Data

US 2012/0249123 A1    Oct. 4, 2012

(30) Foreign Application Priority Data

Apr. 1, 2011    (CN) .......................... 2011 2 0093808

(51) Int. Cl.
*G01B 3/04*    (2006.01)
(52) U.S. Cl.
USPC ............................................. 33/755; 33/759
(58) Field of Classification Search
None
See application file for complete search history.

(56) References Cited

U.S. PATENT DOCUMENTS

| 4,473,952 | A  | * | 10/1984 | Mariani .......................... 33/836 |
| 6,640,460 | B1 | * | 11/2003 | Nabarro et al. ................. 33/759 |
| 8,141,266 | B2 | * | 3/2012  | Sun ................................. 33/755 |
| 8,161,660 | B2 | * | 4/2012  | Swanson et al. ................ 33/756 |
| 2006/0286860 | A1 | * | 12/2006 | Sun ................................. 439/499 |
| 2010/0248555 | A1 | * | 9/2010  | Ma et al. ...................... 439/701 |

* cited by examiner

*Primary Examiner* — Vinh Nguyen
(74) *Attorney, Agent, or Firm* — Altis Law Group, Inc.

(57) ABSTRACT

A measurement device includes a first connector unit, a measurement wire, and a second connector unit. The first connector unit includes a first dummy connector and a wire part. The wire part includes an inserting portion. A number of insert holes is defined in the first connector. The inserting portion of the wire part is selectively inserted in one of the insert holes of the connector. The measurement wire is graduated. A first end of the measurement wire is connected to the first connector body, and a second end of the measurement wire is movably connected to the second connector unit, with the measurement wire stretched out straight between the first and second connector units.

7 Claims, 4 Drawing Sheets

MEASUREMENT DEVICE FOR MEASURING LENGTH OF AN ELECTRICAL WIRE BETWEEN TWO CONNECTORS

BACKGROUND

1. Technical Field

The present application is related to measurement devices, especially to a measurement device for measuring length of an electrical wire.

2. Description of Related Art

Often a time, a measuring tape is needed to measure a wire. However, electrical wire is stiff and difficult to make straight when being measured, and it is difficult to account for how much of the wire will be used up in a connector. Therefore, the use of measuring tape does not produce accurate results. A new measurement device overcoming the limitations described is desired.

DETAILED DESCRIPTION

The disclosure, including the accompanying drawings, is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
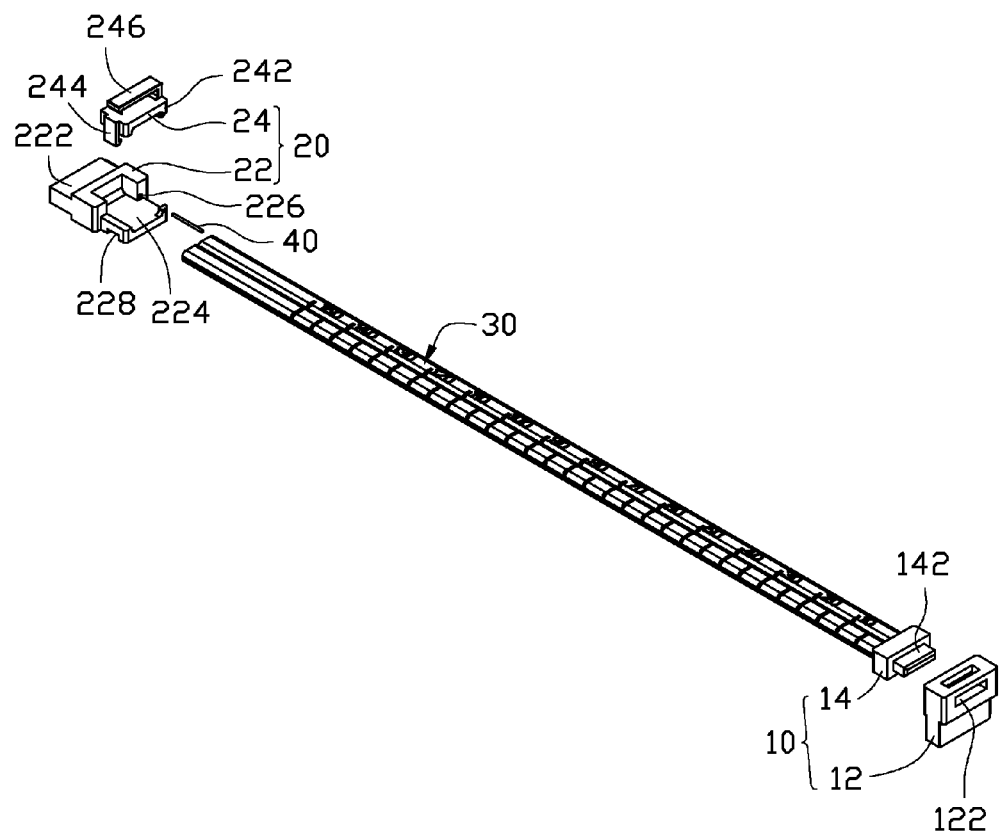
FIG. 1 is an exploded, isometric view of a measurement device of an embodiment of the present application.
Figure 2:
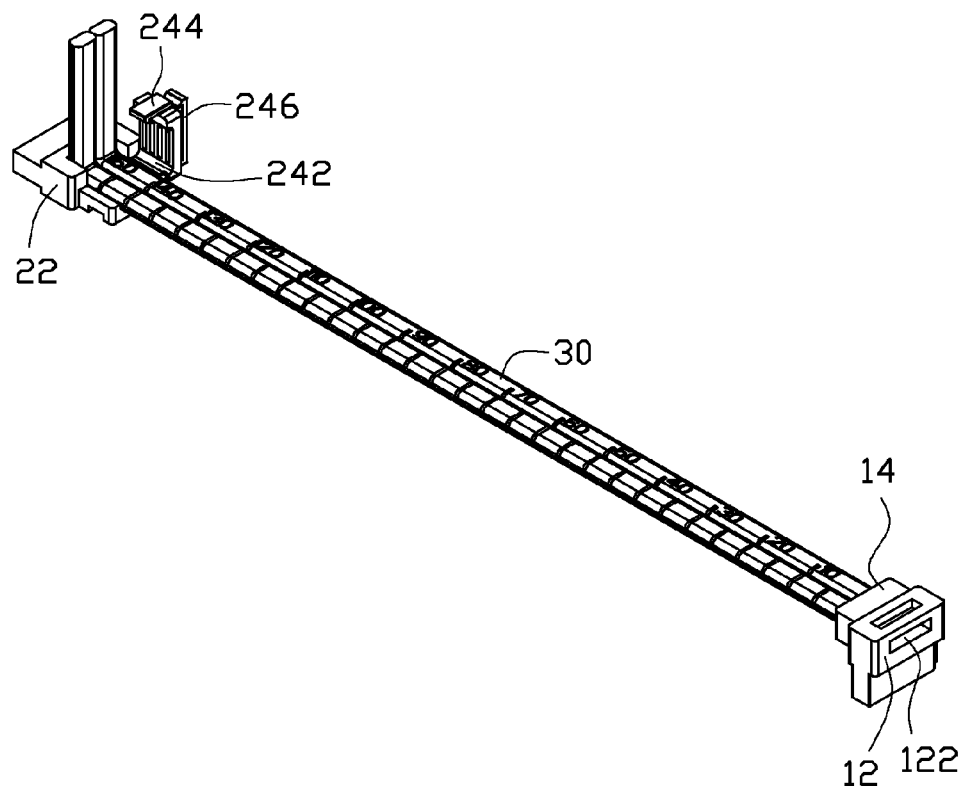
FIG. 2 to FIG. 4 are assembled, isometric views of FIG. 1, but showing different states of use.

Referring to FIG. 1 and FIG. 2, an embodiment of a measurement device of the present application includes a first connector unit 10, a second connector unit 20, and a flexible measurement wire 30. The first connector unit 10 includes a first connector 12 and a wiring part 14 connected to a first end of the measurement wire 30. The first connector 12 is a dummy connector and has no electrical properties, which can be connected to an electronic device, such as a hard disk drive. An inserting portion 142 is formed from one end of the wire part 14 opposite to the measurement wire 30. Three insert holes 122 are defined in a top and two opposite sides of the first connector 12, respectively.

The second connector unit 20 includes a second connector 22 and a locking member 24. The second connector 22 is a dummy connector, and includes an inserting portion 222 without electrical properties and a receiving portion 224 at opposite ends of the second connector 22. Two pivot holes 226 are defined in one side of the receiving portion 224. A recess 228 is defined in another side of the receiving portion 224. The locking member 24 includes a pivot portion 242 and a hook 244 at opposite ends of the locking member 24. The locking member 24 is pivotably attached to the receiving portion 224 through a shaft 40 extending through one of the pivot holes 226, the pivot portion 242, and the other pivot hole 226. A line fixing part 246 is formed on a top of the locking member 24.

The measurement wire 30 is a graduated wire. The measurement wire may be an electrical wire.

Figure 3:
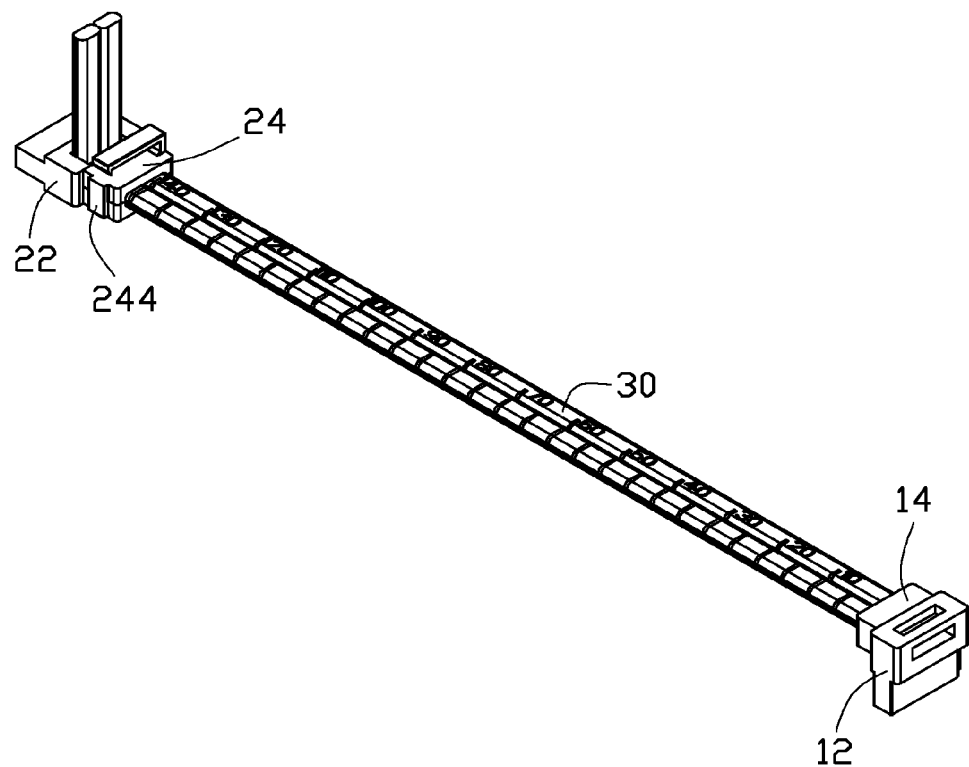
Figure 4:
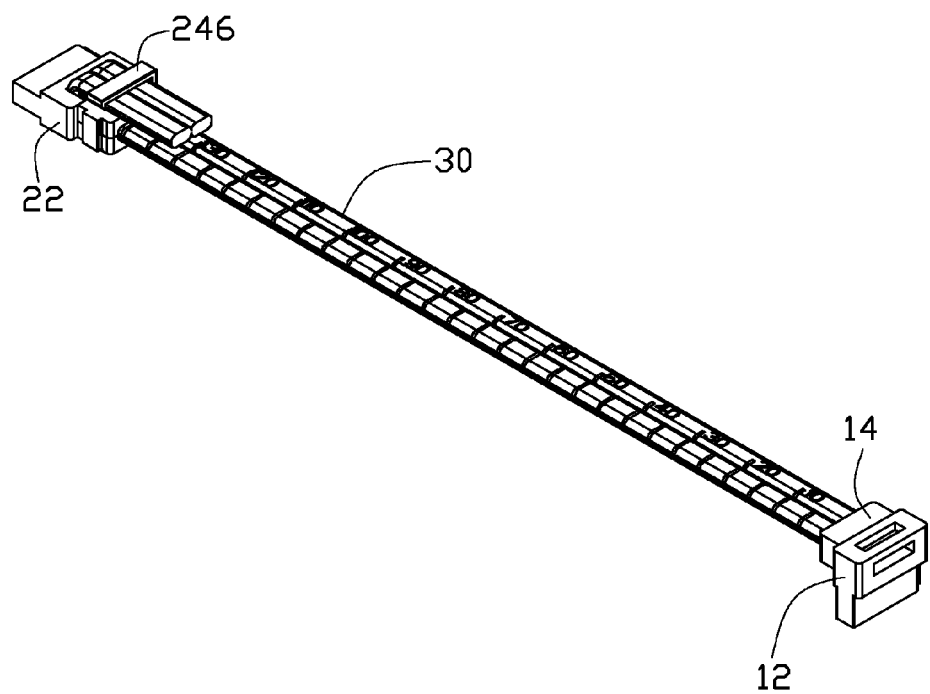

Referring to FIG. 2 to FIG. 4, in use, the inserting portion 142 is selectively engaged in one of the insert holes 122 of the first connector 12. The first connector 12 and the second connector 22 are connected to electrical devices respectively. The measurement wire 30 extends through the receiving portion 224 of the second connector unit 20, and is bent up. The locking member 24 is rotated to the receiving portion 224, and the hook 244 engages in the recess 228. The measurement wire 30 then extends through a gap under the fixing part 246, to stretch a part of the measurement wire 30 between the first and second connectors 10 and 20 to be straight. The scale of the measurement wire 30 located at the locking member 24 is the measured length for a wire to be connected between the first and second connector units 10 and 20.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A measurement device, comprising:
a first connector unit comprising a first connector and a wire part, the wire part comprising a first inserting portion, the first connector defining a plurality of insert holes therein, wherein the first inserting portion of the wire part is selectively inserted into one of the plurality of insert holes of the first connector;
a second connector unit; and
a flexible measurement wire with a scale;
wherein a first end of the measurement wire is connected to the wire part of the first connector unit, and a second end of the measurement wire is movably connected to the second connector unit, with a part of the measurement wire between the first and second connector units adjustable, to measure a length of a wire needed for connecting between the first and second connectors.

2. The measurement device as claimed in claim 1, wherein the measurement wire is an electrical wire.

3. The measurement device as claimed in claim 1, wherein the second connector unit comprises a second connector and a locking member pivotably attached to the second connector, and the second end of the measurement wire is movably sandwiched between the second connector and the locking member.

4. The measurement device as claimed in claim 3, wherein the second connector comprises a second inserting portion and a receiving portion formed at opposite ends of the second connector, the locking member is pivotably connected to the receiving portion, and the second end of the measurement wire is movably sandwiched between the receiving portion and the locking member.

5. The measurement device as claimed in claim 4, wherein two pivot holes are defined in one side of the receiving portion, a recess is defined in another side of the receiving portion, the locking member comprises a pivot portion and a hook at opposite ends of the locking member, the locking member is pivotably attached to the receiving portion through a shaft extending through one of the pivot holes, the pivot portion, and the other pivot hole, the hook is capable of being engaged in the recess.

6. The measurement device as claimed in claim 5, wherein the second end of the measurement wire extends through the receiving portion of the second connector unit, and is bent up to extend through the locking member to be adjusted.

7. The measurement device as claimed in claim 6, wherein a line fixing part is formed on a top of the locking member, through which the measurement wire extends.

* * * * *